Figure 8:
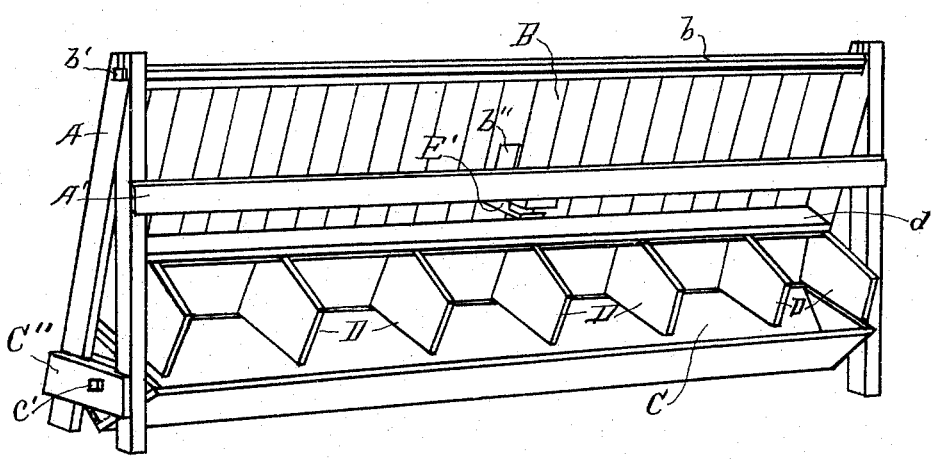

F. L. STEWART.
ANIMAL TROUGH.
APPLICATION FILED JULY 18, 1908.
928,560.
Patented July 20, 1909.
2 SHEETS—SHEET 1.
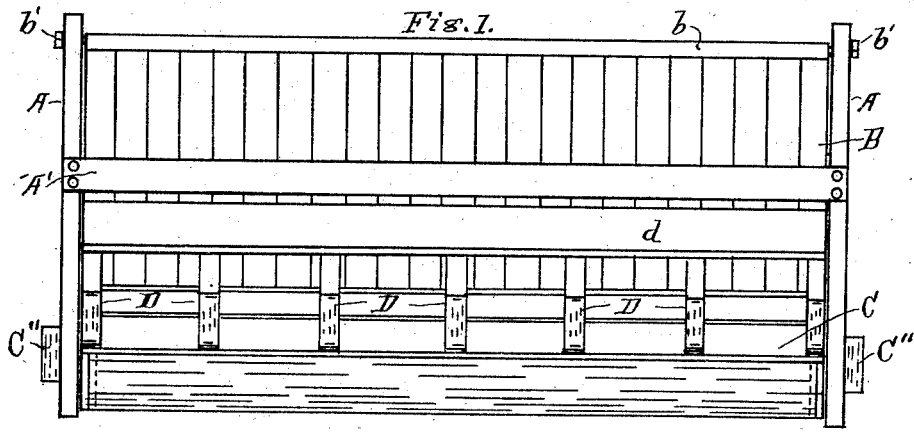
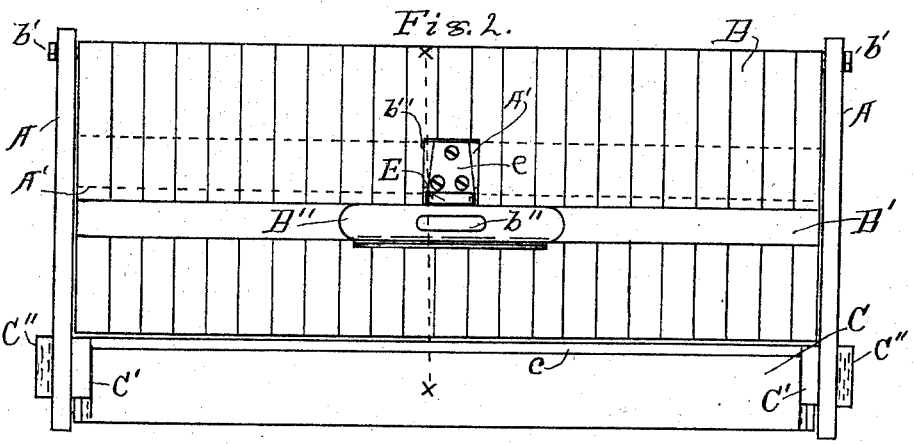
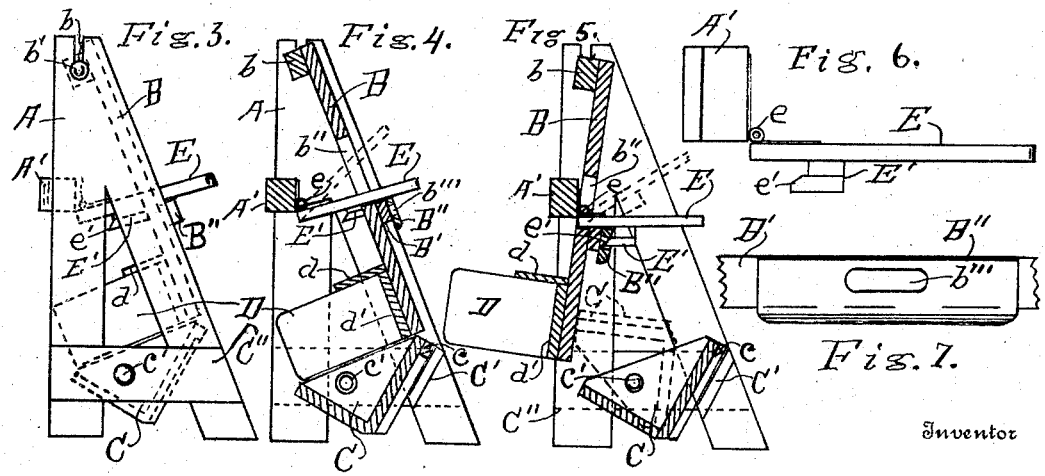
Witnesses
Inventor
Frank L. Stewart
By
Attorney

F. L. STEWART.
ANIMAL TROUGH.
APPLICATION FILED JULY 18, 1908.

928,560.

Patented July 20, 1909.
2 SHEETS—SHEET 2.

Witnesses
E. J. Noble
Wm Hetterschied

Inventor
Frank L Stewart
By
Stuart J. Gilley
Attorney

UNITED STATES PATENT OFFICE.

FRANK L. STEWART, OF BOYNE FALLS, MICHIGAN.

ANIMAL-TROUGH.

No. 928,560.            Specification of Letters Patent.          Patented July 20, 1909.

Application filed July 18, 1908. Serial No. 444,265.

*To all whom it may concern:*

Be it known that I, FRANK L. STEWART, a citizen of the United States, residing at Boyne Falls, in the county of Charlevoix and State of Michigan, have invented certain new and useful Improvements in Animal-Troughs, of which the following is a specification.

My invention relates to improvements in troughs for feeding pigs, sheep, and other small animals, but more particularly for feeding pigs, and its objects are: First, to provide a trough that will absolutely prevent a pig from standing lengthwise in the trough, or, in other words, that will confine each pig to sufficient space in the trough for him alone to eat from, and no more. Second, to provide a means whereby the trough may be absolutely isolated from the pigs when being filled or cleaned, and, third, to provide a means whereby the trough may be turned over for emptying the contents so that the contents will be wholly emptied inside the inclosure in which the pigs are confined and so that none of said contents will flow back to position so that the operator will be obliged to step or stand in it when filling or cleaning the trough. I attain these objects by the mechanism illustrated in the accompanying drawing, in which—

Figure 1 is a front elevation of the trough in position to feed the pigs. Fig. 2 is a back elevation of the same. Fig. 3 is an end elevation of the same, Fig. 4 is a sectional end view on the line $x$ $x$ of Fig. 2 showing the trough in position for the pigs to eat from. Fig. 5 is the same with the swinging gate above the trough swung in so that pigs cannot reach the trough, and showing the trough in position to be filled or cleaned without danger of interference from the pigs. Fig. 6 is an end elevation of the supporting girt with the securing latch hinged to it to more clearly show the construction and operation of this part of the appliance, Fig. 7 is an elevation of a part of the supporting girt showing the catch as provided for the reception of the securing latch that holds the swinging gate or partition to the desired position, and Fig. 8 is a perspective of the front or feed side of the trough with the several parts in position for allowing the animals to feed from the trough.

Similar letters refer to similar parts throughout the several views.

In the construction of this trough I provide two end standards or frames A A, which are connected together and supported in vertical position by means of a supporting girt A'. The trough C is pivotally supported upon said frame by means of bolts $c'$, or other suitable device, connected with or passing through the side girts C'' so that the trough may be readily tipped over, as indicated by the dotted lines in Fig. 5 for emptying its contents, and to facilitate handling the trough for this purpose I place a rib $c$ along the back or out side of the trough, as more plainly shown in Figs. 4 and 5. The trough is supported, when in position to feed, by the pivotal bolts $c'$ and the cleats C', and to complete the device I pivotally support a partition or gate B upon the standards A A of the frame by means of suitable bolts, as $b'$ $b'$, passing through the upper ends of the standards and the ends of the gate directly over the inner edge of the trough so that the gate, when released, will swing from the position shown in Fig. 4 to that shown in Fig. 5, slightly beyond a vertical position, and will be there caught and held by the latch E in position so that the operator may fill, empty or clean the trough without having to assume an unnatural position, and without danger of leaving an opening below the lower edge of the gate through which pigs could pass, as the lower edge of the gate swings downward as it swings in, sufficiently to form close connection with the inner edge of the trough. This partition or gate is provided, at the lower end, with a series of outwardly projecting partitions D, so located as to form stalls between them of sufficient capacity to allow but one pig to enter its head to the trough between any two of these partitions, thus averting all possible danger of a pig climbing into the trough and standing lengthwise thereof, thus occupying several times as much space as necessary and keeping other pigs from the feed. These partitions are secured to the main partition or gate B in position so that they will bear upon both edges of the trough when the gate is thrown back to the position indicated in Figs. 3 and 4 and are held firmly to place by means of the caps $d$ and the plank $d'$, the latter of which acts as a girt to which the lower ends of the boards that form the gate B are nailed. These boards are further supported by means of a girt $b$ at the top and a center girt $B'$.

I provide for securing the gate B to position accessible or inaccessible to the pigs by making an aperture $b''$ through the partition, pivoting or hinging a latch E to the girt $A'$, as at $e$, so that it will extend through the said aperture, and placing a catch $E'$ upon said latch in such a position that when the gate is in the position shown in Fig. 4 the catch $E'$ will drop down to position to receive the side of the gate and hold it to place, but if the latch E is raised to the position of the dotted lines in Figs. 4 and 5 the gate will swing to the position shown in Fig. 5 and the catch E will fall to position so that the point or end $e'$ will enter the slot $b'''$ and hold the gate firmly to place so that the pigs cannot force it back and reach the trough.

I find it necessary to have the end $e'$ of the catch $E'$ project beyond its support on the latch E so that it will enter the slot $e'''$ to avert the danger of the latch being worked upward by the hogs pressing upon or rubbing against the inner surface of the gate, and this catch is beveled on the upper side. This is for the purpose of allowing the latch E to be raised for releasing the gate, without the necessity of first pushing the gate back. It will, also, be noticed that the cleat $B''$ projects below the lower edge of the girt $B'$. This is designed as a hand hold or grip to facilitate handling the gate when drawing it from the position shown in Fig. 5 to that shown in Fig. 4, and the gate is prevented from swinging beyond the position shown in Fig. 4 by reason of the partitions D coming in contact with the upper edge of the trough.

When it is desired to empty and clean the trough the gate B is swung to the position shown in Fig. 5 and the trough C is swung over to the position indicated by its dotted lines, in said figure, so that the contents will be entirely discharged therefrom into the yard where the pigs are confined, when it may be again made to assume its normal position and the operator may fill, empty, clean and manipulate the trough without handling the inner edge thereof, being seen or interfered with by hungry hogs or having to stand in slop and mud where the trough has been emptied, and when emptying the trough the back edge thereof will be thrown against the outside of the gate, as indicated by the dotted lines in Fig. 5, and form a close wall from the ground beneath the trough to the top of the gate, forming a joint between the two that will preclude the possibility of snow, ice, rain &c. entering and filling the trough, thus rendering the trough particularly desirable, not only as a matter of economy and convenience, but as a sanitary appliance for use in the most unsanitary branch of farm work.

The end standards are made triangular in form, as shown at A in Figs. 3, 4 and 5 and so placed that the inner upright will stand vertical, while the outer upright will stand at an incline toward the inner upright, and the gate is so pivotally suspended from the top of these standards that it will hang, normally, directly over the inner edge of the trough but swings beyond this position in closing, where it is caught and held by the latch E so that an animal cannot approach the trough, but when swung back in alinement with the inclined upright the trough will be located inside the inclosure containing the animals so that when released by raising the latch E from engagement with the surface of the gate the gate will naturally swing to position to cut the animals off from access to the trough.

What I claim as new, and desire to secure by Letters Patent of the United States, is:

1. In combination with vertical supporting standards, a trough pivoted at each end near the inner edge to the lower ends of these standards, a gate pivoted at each end near its upper edge to the upper ends of said standards in position so that when hanging normally on its pivots its lower edge will be over the inner edge of the trough but arranged to swing by and lock in position so that the trough may be swung upward and inward toward the pen and the outer edge be made to rest against the outer surface of the gate forming an unbroken wall from the ground up, and means for swinging and locking the gate to position over the trough when the trough is in proper position and accessible to the hogs.

2. In combination with an animal trough, vertical standards, a gate pivotally supported at the upper ends of the standards and suspended therefrom to swing laterally between the standards, the trough pivoted near the inner edge to the lower ends of the standards directly below the lower edge of the gate and in position to be thrown up edgewise so that the outer edge of the trough will rest against the lower outer surface of the gate and form a closed wall from the ground up, and to empty the contents of the trough inside the gate, and means for holding the gate to position.

3. In combination with an animal trough, a frame consisting of two end standards, a girt connecting said standards, the trough pivotally secured to the lower ends of the standards, a gate pivotally suspended from the tops of the standards in position to stand normally over the inner edge of the trough when released and having an aperture through it, a latch pivotally secured to the girt and passing through the aperture in the gate, a girt secured to the gate, a cleat secured to the girt and projecting below it to form a hand hold and having a slot through it, a catch upon the latch having a projecting end in position to engage the slot in the cleat so that the gate cannot be released by the hogs rubbing against the inner surface of the lower edge thereof.

Signed at Grand Rapids Michigan July 2, 1908.

FRANK L. STEWART.

In presence of—
A. ALLGIER,
I. J. CILLEY.